United States Patent
Steyer et al.

(10) Patent No.: US 10,867,191 B2
(45) Date of Patent: Dec. 15, 2020

(54) METHOD FOR DETECTING AND/OR TRACKING OBJECTS

(71) Applicant: Bayerische Motoren Werke Aktiengesellschaft, Munich (DE)

(72) Inventors: Sascha Steyer, Munich (DE); Georg Tanzmeister, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 169 days.

(21) Appl. No.: 15/951,450

(22) Filed: Apr. 12, 2018

(65) Prior Publication Data

US 2018/0300561 A1    Oct. 18, 2018

(30) Foreign Application Priority Data

Apr. 13, 2017 (DE) .......................... 10 2017 206 436

(51) Int. Cl.
```
G06K 9/00       (2006.01)
G05D 1/00       (2006.01)
G05D 1/02       (2020.01)
B60W 40/04      (2006.01)
```
(52) U.S. Cl.
CPC ....... *G06K 9/00805* (2013.01); *G05D 1/0088* (2013.01); *G05D 1/0231* (2013.01); *G05D 1/0255* (2013.01); *G05D 1/0257* (2013.01); *G05D 1/0274* (2013.01); *B60W 40/04* (2013.01); *B60W 2420/403* (2013.01); *G05D 2201/0213* (2013.01)

(58) Field of Classification Search
CPC combination set(s) only.
See application file for complete search history.

(56) References Cited

U.S. PATENT DOCUMENTS

| | | | |
|---|---|---|---|
| 9,696,720 B2* | 7/2017 | Seo ...................... | G05D 1/0088 |
| 9,701,307 B1* | 7/2017 | Newman ............ | B60W 10/184 |
| 2005/0075836 A1* | 4/2005 | Taylor ................... | G06Q 50/26 |
| | | | 702/181 |
| 2006/0293856 A1* | 12/2006 | Foessel ................. | G01S 13/931 |
| | | | 701/301 |

(Continued)

FOREIGN PATENT DOCUMENTS

DE    10 2013 223 803 A1    5/2015

OTHER PUBLICATIONS

German-language Search Report issued in counterpart German Application No. 10 2017 206 436.6 dated Mar. 15, 2018 with partial English translation (16 pages).

(Continued)

*Primary Examiner* — Zhiyu Lu
(74) *Attorney, Agent, or Firm* — Crowell & Moring LLP

(57) ABSTRACT

A method for detecting and/or tracking an object in surroundings of a vehicle is described. The method ascertains, at a first time, on the basis of sensor data from one or more ambient sensors of the vehicle, measurement data for a multiplicity of cells of a grid of the surroundings of the vehicle, the measurement data for a first cell indicating an object probability. Moreover, the method ascertains an occupancy probability of the first cell being occupied by an object that was already detected at a preceding time. The method further assigns the first cell to the object in dependence on the object probability and in dependence on the occupancy probability.

10 Claims, 3 Drawing Sheets

(56) References Cited

U.S. PATENT DOCUMENTS

| | | | |
|---|---|---|---|
| 2015/0046078 A1* | 2/2015 | Biess | G08G 1/163 |
| | | | 701/301 |
| 2015/0154328 A1* | 6/2015 | Michalke | B60W 40/04 |
| | | | 703/1 |
| 2016/0137206 A1* | 5/2016 | Chandraker | G06T 17/00 |
| | | | 382/104 |
| 2017/0021864 A1* | 1/2017 | Sonntag | B60W 30/085 |
| 2017/0256071 A1* | 9/2017 | Laugier | B60W 40/04 |

OTHER PUBLICATIONS

Danescu et al., "Modeling and Tracking the Driving Environment With a Particle-Based Occupancy Grid", IEEE Transactions on Intelligent Transportation Systems, Dec. 2011, pp. 1331-1342, vol. 12, No. 4.

* cited by examiner

METHOD FOR DETECTING AND/OR TRACKING OBJECTS

CROSS REFERENCE TO RELATED APPLICATION

This application claims priority under 35 U.S.C. § 119 from German Patent Application No. 10 2017 206 436.6, filed Apr. 13, 2017, the entire disclosure of which is herein expressly incorporated by reference.

BACKGROUND AND SUMMARY OF THE INVENTION

The invention relates to a method and a corresponding processing unit for detecting and/or tracking objects on the basis of sensor data from ambient sensors of a vehicle.

A vehicle typically comprises a plurality of different ambient sensors that are set up to capture different sensor data for surroundings of the vehicle. Exemplary ambient sensors are radar sensors, ultrasonic sensors, lidar sensors, image sensors, etc. On the basis of the sensor data of the one or more ambient sensors of a vehicle, one or more objects (e.g. one or more other vehicles) in surroundings of the vehicle can be detected.

The present document is concerned with the technical object of providing a method and a corresponding processing unit that allow an object in the surroundings of a vehicle to be detected and tracked in a precise and robust manner.

The object is achieved by the features of the independent patent claims. Advantageous embodiments are described in the dependent claims, inter alia. It is pointed out that additional features of a patent claim dependent on an independent patent claim, without the features of the independent patent claim or only in combination with a subset of the features of the independent patent claim, can form a separate invention, independent of the combination of all of the features of the independent patent claim, that can be turned into the subject matter of an independent claim, a divisional application or a subsequent application. This applies in the same way for technical teachings described in the description that are able to form an invention independent of the features of the independent patent claims.

According to one aspect, a method for detecting and/or tracking an object (e.g. another road user, for example another vehicle) in surroundings of a vehicle is described. The object may in particular be a dynamic or moving object. The method can be carried out by a processing unit (e.g. by a controller) of the vehicle. The vehicle can comprise a road motor vehicle, such as e.g. an automobile, a truck, a bus or a motor cycle.

The method comprises ascertaining, at a first time, on the basis of sensor data from one or more ambient sensors of the vehicle, measurement data for a multiplicity of cells of a grid of the surroundings of the vehicle. The measurement data for a first cell from the multiplicity of cells show an object probability of the first cell being occupied by an object. Moreover, the measurement data for the first cell indicate a cell speed of the first cell.

The method further comprises ascertaining an occupancy probability of the first cell being occupied by an object that was already detected at a preceding time. The occupancy probability is ascertained on the basis of a state of the object at the preceding time. Moreover, the method comprises assigning the first cell to the object in dependence on the object probability and in dependence on the occupancy probability.

According to a further aspect, a method for detecting an object in surroundings of a vehicle is described. The method comprises ascertaining, on the basis of sensor data from one or more ambient sensors of the vehicle, a set of dynamic cells of a grid of the surroundings of the vehicle. In this case, the sensor data indicate cell speeds of cells of the grid. The method further comprises forming a cell cluster from the set of dynamic cells in dependence on a cluster measure, the cluster measure being dependent on the cell speed of the dynamic cells of the cell cluster. Moreover, the method comprises expanding the cell cluster with one or more cells from an immediate vicinity of the cell cluster without taking into consideration the cell speed of the one or more cells. Furthermore, the method comprises detecting an object on the basis of the cell cluster.

According to a further aspect, a method for detecting an object in surroundings of a vehicle is described. The method comprises ascertaining, on the basis of sensor data from one or more ambient sensors of the vehicle, cells of a grid of the surroundings of the vehicle that belong to an object. In this case, the sensor data indicate cell speeds of cells of the grid. Moreover, the method comprises ascertaining an orientation of the object on the basis of the cell speeds of the cells of the object. The method further comprises ascertaining a width and a length of the object taking into consideration the ascertained orientation of the object.

According to a further aspect, a processing unit is described that is set up to carry out one or more of the methods described in this document.

According to a further aspect, a vehicle (e.g. an automobile, a truck or a motor cycle) is described that comprises the evaluation unit described in this document.

According to a further aspect, a software (SW) program is described. The SW program can be set up to be executed on a processor (e.g. on a controller of a vehicle) and to thereby carry out at least one of the methods described in this document.

According to a further aspect, a storage medium is described. The storage medium can comprise an SW program that is set up to be executed on a processor and thereby to carry out at least one of the methods described in this document.

It should be noted that the methods, apparatuses and systems described in this document can be used either on their own or in combination with other methods, apparatuses and systems described in this document. Furthermore, any aspects of the methods, apparatuses and systems described in this document can be combined with one another in a wide variety of ways. In particular, the features of the claims can be combined with one another in a wide variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
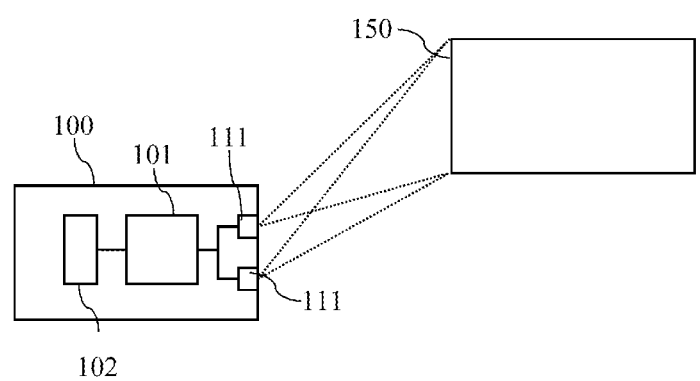
FIG. 1 shows an exemplary vehicle having a plurality of different ambient sensors.

As set out at the outset, the present document is concerned with the detection and tracking of at least one object on the basis of sensor data from one or more ambient sensors of a vehicle. In this context, FIG. 1 shows a vehicle 100 having one or more ambient sensors 111 for capturing sensor data. The vehicle 100 further comprises a processing unit 101 that is set up to take the sensor data as a basis for detecting an object 150 in the surroundings of the vehicle 100. A detected object 150 can then be used in a vehicle function 102 (e.g. for semi-automated or highly automated driving of the vehicle 100).

Figure 2:
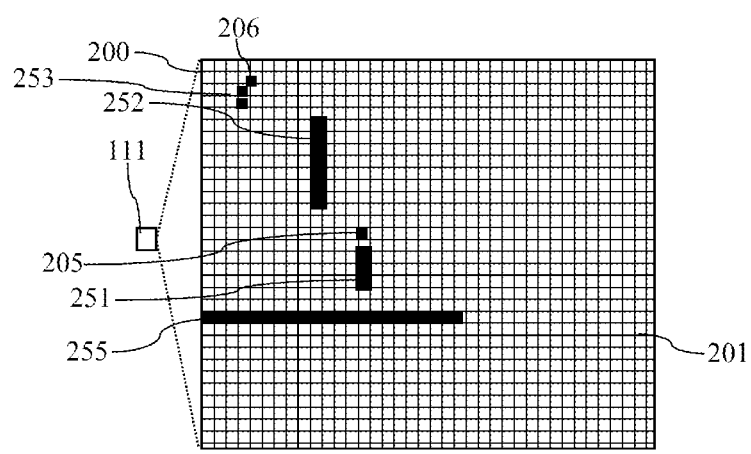
FIG. 2 shows an exemplary grid of surroundings of a vehicle.

FIG. 2 shows an exemplary grid 200 of surroundings of the vehicle 100 having a multiplicity of grid cells, or cells for short, 201. The grid 200 can divide the surroundings of the vehicle 100 into the multiplicity of two- or three-dimensional cells 201. A two-dimensional cell 201 may have a rectangular shape in this case (for example with an edge length of 10 cm, 5 cm, 2 cm, 1 cm or less).

The processing unit 101 may be set up to take the sensor data as a basis for ascertaining measurement data $z_c$ for one or more of the cells 201 (in particular for each cell 201). In this case, the measurement data $z_c$ for a cell c 201 indicate e.g.

$$z_c = (m(S), m(D), m(\{S,D\}), m(F), v_c),$$

where m(S) is evidence that the cell c 201 is occupied by a static object 150 (and is therefore a static (occupied) cell 201), where m(D) is evidence that the cell c 201 is occupied by a dynamic object 150 (and is therefore a dynamic (occupied) cell 201), where m({S,D}) is evidence that the cell c 201 is occupied by an object 150 that cannot be explicitly detected as static or dynamic (and is therefore an unclassifiable occupied cell 201), and where m(F) is evidence that the cell c 201 is free, and is therefore not occupied by an object 150 (and is therefore a free cell 201). The evidence that the cell 201 is occupied by an object 150 (in particular m(S), m(D), m({S,D})) can be regarded as an object probability of the cell 201 being occupied by an object 150 (in particular within the context of the Dempster-Shafer theory). Furthermore, the sensor data can be taken as a basis for ascertaining a (directional) cell speed $v_c$, i.e. the absolute value of the speed and possibly the direction of movement of the cell c 201 can be ascertained. From the direction of movement, it is typically also possible for the orientation of the cell 201 to be inferred.

These measurement data can be ascertained for at least some of the cells 201 of the grid 200 at an initial time $t_0$. It is then possible, on the basis of the measurement data, for one or more objects 251, 252, 255 to be detected, e.g. by using a cluster algorithm. By way of example, adjacent cells c 201 that have a relatively high level of evidence of the presence of a dynamic object 150 and that have a relatively similar speed $v_c$ can be combined to form an object 251, 252. An object τ 251, 252 can be depicted by a (e.g. rectangular) box with cells 201. Furthermore, an object speed $v_\tau$ (with an absolute value and a direction) can be ascertained, in particular on the basis of the cell speeds $v_c$ of the cells 201 contained in the object τ 251, 252.

The one or more (dynamic) objects τ 251, 252 detected at an initial time $t_0$ can be taken into consideration during the assignment of cells 201 to an object τ 251, 252 at a subsequent first time $t_1$. It is thus possible for the robustness and reliability of the object detection and/or the object tracking to be increased. Moreover, it is thus possible for changes of speed of an object (in particular the halting of a dynamic object) to be reliably detected and taken into consideration.

At the first time $t_1$, the sensor data of the one or more ambient sensors 111 can be taken as a basis for ascertaining updated measurement data $z_c$ for cells 201 of the grid 200. It is therefore possible to ascertain, for an exemplary first cell 205 at the first time $t_1$, the object evidence and/or the object probability of the first cell 205 being occupied by a (possibly dynamic) object at the first time $t_1$. Furthermore, the cell speed $v_c$ of the first cell 205 can be ascertained.

The one or more (possibly dynamic) objects 251, 252 of the initial time $t_0$ can be transformed for the first time $t_1$. In other words, it is possible to predict, in particular on the basis of the object speed $v_\tau$ of an object 251, 252, which cells 201 of the grid 200 are occupied by the object 251, 252 at the first time $t_1$. In particular, it is possible, (possibly solely) on the basis of the state of an object 251, 252 at the initial time $t_0$, to ascertain for the first cell 205 the occupancy probability $\alpha_o(c,\tau)$ of the first cell c 205 being occupied by an object τ 251, 252. In this case, the occupancy probability $\alpha_o(c,\tau)$ is preferably independent of the measurement data for the cells 201 of the grid 200 (in particular for the first cell 205) at the first time $t_1$.

Furthermore, an association probability $\alpha_v(z_c,\tau)$ of the first cell 205 being associated with an object τ 251, 252, i.e. belonging to the object τ 251, 252, can be ascertained. For this purpose, it is in particular possible for the cell speed $v_c$ of the first cell 205 at the first time $t_1$ to be compared with the (predicted) object speed $v_\tau$ of the object τ 251, 252 at the first time $t_1$. A similar cell or object speed typically results in a relatively high association probability.

The association probability $\alpha_v(z_c,\tau)$ and the occupancy probability $\alpha_o(c,\tau)$ can be ascertained for multiple possible objects τ 251, 252. It is possible for a first object 251 allowing a maximum (weighted) combination of the association probability $\alpha_v(z_c,\tau)$ and the occupancy probability $\alpha_o(c,\tau)$ to be selected as a possible object 252 for the first cell 205.

The first cell 205 can be assigned to the selected first object 251 possibly only if the object evidence and/or the object probability of the first cell 205 being part of a (dynamic) object 251, 252 at the first time $t_1$ exceeds a determined minimum value or a determined object threshold value. In this case, the minimum value may be dependent on the combination probability of the association probability $\alpha_v(z_c,\tau)$ and the occupancy probability $\alpha_o(c,\tau)$. Typically, the minimum value rises as the combination probability falls (and vice versa).

This allows cells 205 to be assigned in a robust manner to objects 251, 252 that have already been detected beforehand.

Even after one or more cells 205 are assigned to one or more objects 251, 252, the measurement data for the first time $t_1$ can still indicate one or more cells 201 that belong to an (as yet undetected) object 253. On the basis of the measurement data, it is possible for a set of dynamic cells 206 to be ascertained, i.e. cells 206 that have a relatively high level of evidence or probability of the respective cell 206 being occupied by a dynamic object 253, and/or cells 206 that have a relatively high cell speed $v_c$.

From the set of dynamic cells 206, it is possible for a cell cluster to be formed, the formation of the cell clusters being able to involve a cluster measure being used that:

takes into consideration the distances and/or the positional density of multiple dynamic cells 206 and/or the distance of a dynamic cell 206 from a cluster center, and possibly limits these to a maximum admissible distance; and/or takes into consideration the relative speed between two dynamic cells 206 and/or the relative speed of a dynamic cell 206 in relation to a speed of the cluster, and possibly limits these to a maximum admissible relative speed; and/or takes into consideration a level of evidence or probability of cells between two dynamic cells 206 of a cluster being free, and possibly limits these to a maximum admissible level of free-space evidence.

It is therefore possible for at least one cell cluster that satisfies the aforementioned cluster measure to be formed from the set of dynamic cells 206.

During the formation of a cell cluster, one or more cells 201, 206, in particular dynamic cells 206 from the set of dynamic cells 206, can be ignored, the cells 201, 206 being adjacent to the cell cluster. This can in particular be caused by erroneous estimates of the cell speeds (in particular of the direction of movement) (e.g. in the case of relatively elongate objects 253). It is therefore possible for expansion of an ascertained cell cluster by one or more adjacent cells 201, 206 to be performed. An adjacent cell 201, 206 may be a dynamic cell 206 from the set of dynamic cells 206, which possibly has a different cell speed than the cells of the cell cluster, however. Alternatively, an adjacent cell 201, 206 may be a static (occupied) or unclassifiable occupied cell 201. It is therefore possible for any occupied cell 201, 206 (with relatively high levels of evidence m(S), m(D), m({S, D})) in the vicinity of the cell cluster to be taken into consideration. During the expansion of an ascertained cell cluster, the cell speeds of the one or more cells 201, 206 can therefore be ignored. It is therefore possible for an expanded cell cluster to be formed solely on the basis of geometric aspects.

As a result of such expansion of a cell cluster, it is possible to check whether a cell cluster having dynamic cells 206 is adjacent e.g. to one or more static (occupied) cells 201 and/or to one or more dynamic cells 206 having a different cell speed. If this is the case, it may be possible to detect that the original cell cluster having dynamic cells 206 contains an erroneous speed and/or dynamics estimate and/or that the original cell cluster is not a dynamic object 253 at all.

Further examination of the possibly expanded cell cluster can involve the variance of the speed of the expanded cell cluster (preferably in relation to the average speed of the original, unexpanded cell cluster) being ascertained. If there is a relatively high level of variance in the speed of an expanded cell cluster, then it can be assumed that the cell cluster is not a uniform object 253. On the other hand, the expanded cell cluster can be regarded as a new object 253 and tracked in a sequence of subsequent times. Additionally, a (possibly initial) probability of existence of a new object 253 can be derived from the variance in the speed of the expanded cell cluster, with a higher probability of existence of a new object 253 being obtained from a lower variance in the speed (and vice versa).

As already set out above, an object 251, 252, 253 can be described by a box model, so that the state of the object 251, 252, 253 can be described, for example by:

the position $(x_\tau, y_\tau)$ of a reference point on the object;
the absolute value of the object speed $v_\tau$;
the orientation $\varphi_\tau$ of the object;
the width $w_\tau$ and the length $l_\tau$ of the object;
the acceleration $a_\tau$ of the object; and/or
the rotation rate $\omega_\tau$ of the object.

The absolute value of the object speed $v_\tau$ and the orientation $\varphi_\tau$ of an object 253 at the time $t_1$ can be ascertained from the cell speeds $v_c$ of the cells 206 of the object 253 at the time $t_1$.

Ascertaining the width $w_\tau$ and the length $l_\tau$ of the object 253 can involve the geometric arrangement of the cells 206 in the grid 200 being taken into consideration. Furthermore, the previously ascertained orientation $\varphi_\tau$ of the object 253 can be taken into consideration. When ascertaining the edges of the rectangular box model of the object 253, the evidence of directly adjacent cells 201 of the object 253 being free can be taken into consideration. It is thus possible for the contours of an object 253 to be ascertained in a precise manner.

At a first time $t_1$, it is therefore possible for:

one or more cells 205 of a grid 200 to be assigned to one or more objects 251 that have already been detected at a preceding time $t_0$; in this case, the state of the one or more objects 251 at the preceding time $t_0$ is taken into consideration;

remaining dynamic cells 206 of the grid 200 to be combined to form a cell cluster in order to detect a new object 253;

a box model to ascertain a defined and precise state for the one or more detected objects 251, 252, 253.

Therefore, a recursive method for detecting and tracking objects 251, 252, 253 in surroundings of a vehicle is made possible that can be carried out at a sequence of times in order to describe the state of the objects 251, 252, 253 in the surroundings of the vehicle at the sequence of times.

Figure 3:
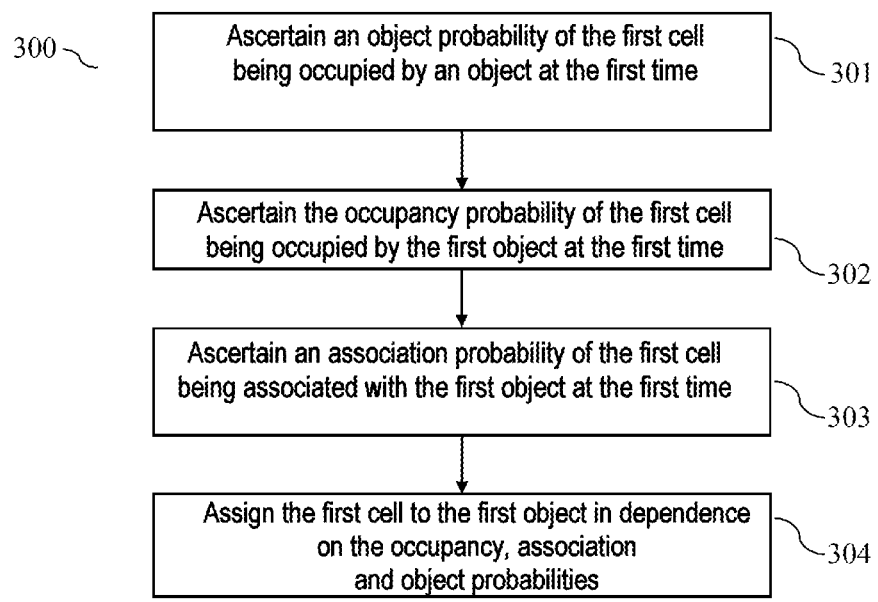
FIG. 3 shows a flowchart for an exemplary method for detecting and/or tracking an object in surroundings of a vehicle.
Figure 4:
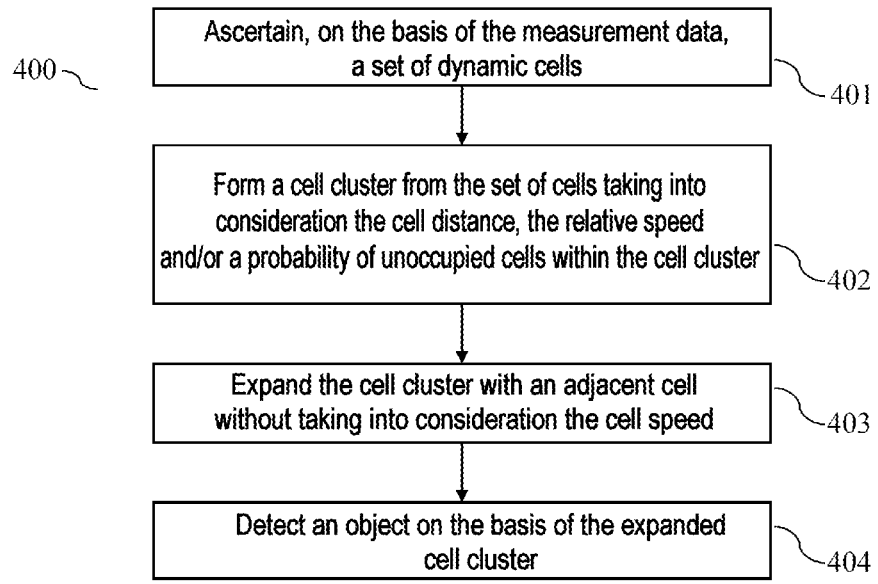
FIG. 4 shows a flowchart for a further exemplary method for detecting an object in surroundings of a vehicle.
Figure 5:
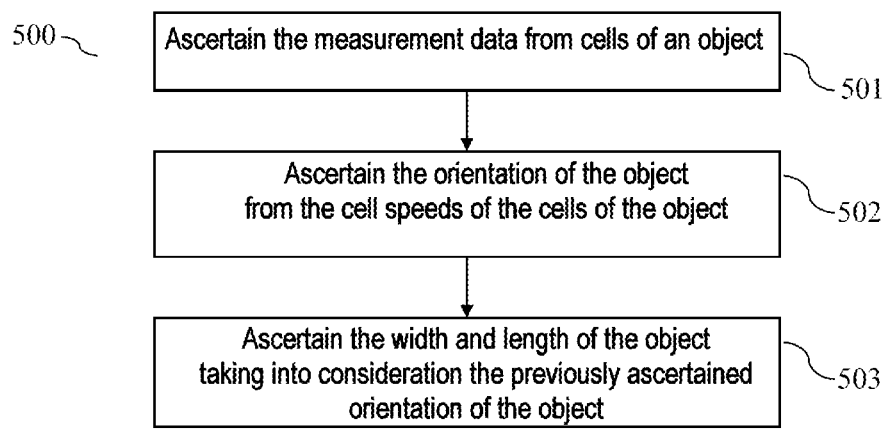
FIG. 5 shows a flowchart for a further exemplary method for detecting an object in surroundings of a vehicle.

FIGS. 3 to 5 show flowcharts for exemplary methods 300, 400, 500 for detecting and/or tracking an object 251, 253 in surroundings of a vehicle 100. The methods 300, 400, 500 can be carried out separately or in combination. The methods 300, 400, 500 can be carried out by a processing unit 101 of a vehicle 100 in this case.

The method 300, 400, 500 comprises ascertaining 301, at a first time $t_1$ and on the basis of sensor data from one or more ambient sensors 111 of the vehicle 100, measurement data for a multiplicity of cells 201, 205, 206 of a grid 200 of the surroundings of the vehicle 100. The surroundings of the vehicle 100 can be divided into a two-dimensional (2D) grid 200 having grid cells 201, 205, 206, one grid cell 201, 205, 206 having e.g. a size of 1 cm×1 cm or of 10 cm×10 cm.

The measurement data for a first cell 205 can indicate the state of the first cell 205. By way of example, all or some of the measurement data can comprise the vector:

$$z_c = (m(S), m(D), m(\{S,D\}), m(F), v_c).$$

In particular, the measurement data for the first cell 205 can indicate an object probability of the cell 201, 205, 206 being occupied by a (static and/or dynamic) object 251, 253. In this case, the object probability may be dependent on the evidences or measures m(S), m(D) and/or m({S,D}). Moreover, the measurement data for the first cell 205 can indicate a cell speed $v_c$ of the first cell 205. In this case, the cell speed can have an absolute value and a direction of movement. Correspondingly, the state for multiple (in particular all) cells 201 of the grid 200 can be described by the measurement data.

The one or more ambient sensors 111 can comprise e.g. one or more radar sensors, one or more ultrasonic sensors, one or more lidar sensors, one or more image sensors, etc. The sensor data from multiple ambient sensors 111 can be overlaid or combined in order to ascertain the state or the measurement data of the cells 201 of the grid 200.

Moreover, the method 300, 400, 500 can comprise ascertaining 302 an occupancy probability of the first cell 205 being occupied by an object 251, 252, the object 251, 252 already having been detected at a preceding time $t_0$. In this case, the occupancy probability is ascertained (possibly solely) on the basis of a state of the object 251, 252 at the preceding time $t_0$. In particular, during the ascertainment of the occupancy probability, the measurement data for the cells 201, 205, 206 of the grid 200 for the first time $t_1$ can be ignored.

On the basis of the measurement data for the cells 201 of the grid 200 at the preceding time $t_0$, the state of the cells 201 of the object 251, 252 at the preceding time $t_0$ may have been ascertained. From the state of the cells 201 of the object 251, 252, the state of the object 251, 252 may in turn have been ascertained. The state of an object 251, 252 can, as set out above, be described by one or more of the following state parameters: the position $(x_\tau, y_\tau)$ of a reference point on the object 251, 252; the absolute value of the object speed $v_\tau$; the orientation $\varphi_\tau$ of the object 251, 252; the width $w_\tau$ and the length $l_\tau$ of the object 251, 252 (e.g. the width $w_\tau$ and the length $l_\tau$ of a box model of the object 251, 252); the acceleration $a_\tau$ of the object 251, 252; and/or the rotation rate $\omega_\tau$ of the object 251, 252.

The state of the object 251, 252 at the preceding time $t_0$ can be used to predict which cells 201 of the grid 200 are occupied at the subsequent first time $t_1$. In other words, it is possible to ascertain the occupancy probability $\alpha_o(c,\tau)$ of the object $\tau$ 251, 252 occupying the first cell c 205. The occupancy probability $\alpha_o(c,\tau)$ of the cells 201 of the grid 200 being occupied by the object t 251, 252 can be ascertained for multiple cells 201 (possibly for all cells 201) of the grid 200.

The method 300, 400, 500 further comprises assigning 304 the first cell 205 to the object 251, 252, in dependence on the object probability and in dependence on the occupancy probability. In particular, the first cell 205 can be assigned to the object 251, 252 if the object probability indicates a relatively high probability of the first cell 205 being occupied by an object 251, 252 (in general), and if the occupancy probability indicates a relatively high probability of the first cell 205 being occupied by a specific object 251, 252.

Taking into consideration the state of one or more objects 251, 252 already detected previously allows the detection of free spaces and/or the detection of (dynamic and static) objects 251, 252 in the surroundings of a vehicle 100 to be improved. In particular, it is thus also possible for dynamic (i.e. mobile) objects 251, 252 to be detected that are only temporarily at a standstill (e.g. at a red traffic light).

The method 300, 400, 500 can comprise ascertaining 303 an association probability of the first cell 205 being part of the object 251, 252. The association probability can be ascertained on the basis of the cell speed of the first cell 205 and on the basis of an object speed of the object 251, 252.

As already set out above, the state of an object 251, 252 at a preceding time $t_0$ can comprise the absolute value and/or the orientation or direction of the object speed $v_\tau$ at the preceding time $t_0$. (Possibly solely) from the state of the object 251, 252 at the preceding time $t_0$, the object speed $v_\tau$ at the first time $t_1$ can be predicted. The predicted object speed $v_\tau$ at the first time $t_1$ can then be compared with the cell speed $v_c$ of the first cell 205 at the first time $t_1$ in order to ascertain the association probability $\alpha_v(z_c,\tau)$. The association probability $\alpha_v(z_c,\tau)$ in this case typically increases as the concordance of the absolute value and/or direction of the speeds rises, and falls as the concordance of the absolute value and/or direction of the speeds falls.

The first cell 205 can then be assigned to the object 251, 252 also in dependence on the association probability. Taking into consideration the association probability allows the accuracy of the detection and the tracking of objects 251, 252 to be increased further.

It is possible for the occupancy probability and the association probability to be ascertained for a plurality of objects 251, 252 that were already detected at the preceding time $t_0$. It is then possible for a plurality of combination probabilities for the plurality of objects 251, 252 to be ascertained from the respective occupancy probability and from the respective association probability. In particular, a weighted average can be ascertained from the occupancy probability and the association probability as a combination probability for an object 251, 252. A relatively high combination probability of an object 251, 252 in this case indicates a relatively high probability of the first cell 205 being occupied by the object 251, 252. On the other hand, a relatively low combination probability of an object 251, 252 indicates a relatively low probability of the first cell 205 being occupied by the object 251, 252.

The method 300, 400, 500 can comprise selecting a first object 251 from the plurality of objects 251, 252 on the basis of the plurality of combination probabilities. In particular, the first object 251 can be selected from the plurality of objects 251, 252 that has the highest combination probability.

The first cell 205 can then be assigned to the first object 251 in dependence on the object probability and in dependence on the combination probability of the first object 251. Taking into consideration multiple objects 251, 252 and the combination probabilities thereof allows the detection and tracking of objects 251, 252 to be improved further.

The first cell 205 can be assigned to an object 251, 252 if the object probability for the first cell 205 is greater than or equal to an object threshold value. In this case, the object threshold value may be dependent on the occupancy probability and/or on the association probability for the object 251, 252. The object threshold value typically rises as the occupancy probability and/or association probability fall(s). On the other hand, the object threshold value typically falls as the occupancy probability and/or association probability rise(s). This allows reliable tracking of objects 251, 252.

The method 300, 400, 500 can, as depicted in FIG. 4, comprise ascertaining 401, on the basis of the measurement data, a set of dynamic cells 206. By way of example, at the first time $t_1$, a set of dynamic cells 206 can be ascertained that cannot be assigned to an object 251, 252 already detected previously. The set of dynamic cells 206 can therefore at least indicate a new object 253 that has not yet been able to be detected previously (e.g. because the new object 253 did not reach the capture range of the one or more ambient sensors 111 of the vehicle 100 until at the first time $t_1$).

In this case, a dynamic cell 206 may be a cell 201 of the grid 200 that has a cell speed that is greater than or equal to a dynamics threshold value. Alternatively or additionally, a dynamic cell 206 may be a cell 201 of the grid 200 that has an object probability that is greater than or equal to an object threshold value. The object threshold value may be a constant value in this case.

Moreover, the method 300, 400, 500 comprises forming 402 a cell cluster from the set of dynamic cells 206 in dependence on a cluster measure. In this situation, the cluster measure is typically dependent on the cell speed of the dynamic cells 206 of the cell cluster. In particular, the cluster measure can be taken as a basis for combining multiple dynamic cells 206 that have a relatively similar cell speed (in regard to absolute value and/or direction).

The method 300, 400, 500 can further comprise expanding 403 the cell cluster with one or more cells 201, 206 from an immediate vicinity of the cell cluster. That is to say that the cell cluster can be expanded with one or more cells 201, 206 that are directly adjacent to the cell cluster. In this case, during the expanding 403 the cell speed of the one or more cells 201, 206 is ignored. During the expansion, it is therefore possible for dynamic cells 206 and/or static occupied cells 201 and/or unclassifiably occupied cells 201 to be taken into consideration.

It is then possible for the (expanded) cell cluster at the first time $t_1$ to be taken as a basis for detecting a new object 253 that was not yet detected at the preceding time $t_0$ (step 404). The expanding of the cell cluster with one or more directly adjacent cells 201, 206 allows measurement errors during the ascertainment of the cell speed (which may be present e.g. in the case of rectilinear objects 255) to be compensated for. It is therefore possible for the reliability of the object detection to be increased.

The cluster measure can comprise, inter alia, one or more of the following components or may be dependent on one or more of the following components: a distance of a dynamic cell 206 from a reference point (e.g. from a center or main focus) of the cell cluster; a distance between two dynamic cells 206; a density or a positional density of dynamic cells 206 in a determined area; a relative speed of the cell speed of a dynamic cell 206 relative to a cluster speed of the cell cluster; a relative speed between two adjacent dynamic cells 206; and/or a non-occupancy probability of one or more cells 201 between the dynamic cell 206 and the reference point of the cell cluster being free. In this case, a cell cluster can be formed, so that the distance of the dynamic cells 206 of the cell cluster does not exceed a determined limit distance, so that the relative speed of the dynamic cells 206 of the cell cluster does not exceed a determined limit speed and/or so that the non-occupancy probability of the dynamic cells 206 of the cell cluster does not exceed a determined limit probability. It is thus possible for a cell cluster to be ascertained that has a relatively high probability of corresponding to an object 253.

The method 300, 400, 500 can comprise ascertaining a variance of the cell speeds of the dynamic cells 206 of the cell cluster. In this case, an average speed of the (possibly unexpanded) cell cluster can be taken into consideration. It is then possible for an object 253 to be detected in dependence on the variance of the cell speeds. In particular, it is possible to decide in dependence on the variance of the cell speeds whether or not the cell cluster is a coherent object 253. By way of example, the variance of the cell speeds can be compared with a variance threshold value in order to decide whether the cell cluster is an object 253 (e.g. it may be an object 253 if the variance is less than or equal to the variance threshold value).

The method 300, 400, 500 can comprise ascertaining a state of a first object 251 at the first time $t_1$. In this case, the state of the first object 251 can be ascertained on the basis of the measurement data of the cells 205, 206 that are assigned to the first object 251, 253 at the first time $t_1$. Furthermore, the state of the first object 251 at the first time $t_1$ can be ascertained on the basis of the state of the first object 251 at the preceding time $t_0$ (e.g. to ascertain the acceleration or deceleration and/or to ascertain the rotation rate of the first object 251). The state of the first object 251 at the first time $t_1$ can then be used to predict the position of the first object 251 at a subsequent second time $t_2$. Furthermore, the state of the first object 251 at the first time $t_1$ can be used to ascertain the occupancy probabilities of one or more cells 201 of the grid 200 being occupied by the first object 251 at the subsequent second time $t_2$.

Ascertainment of the state of the first object 251 can involve the method 300, 400, 500, as depicted in FIG. 5, comprising ascertaining 502 an absolute value of an object speed and/or of an orientation of the first object 251 on the basis of the cell speeds of the cells 205 assigned to the first object 251. The width and length of the first object 251, in particular of a box model of the first object 251, can then be ascertained taking into consideration the ascertained orientation of the first object 251 (step 503). As a result of the orientation of the first object 251 at the first time $t_1$ being taken into consideration during the ascertainment of the width and length of the first object 251 at the first time $t_1$, it is possible for the first object 251 to be detected with increased accuracy.

The method 300, 400, 500 can comprise ascertaining an edge of the first object 251. During the detection of an edge, the non-occupancy probability of one or more directly adjacent cells 201 of the first object 251 being free can be taken into consideration. It is thus possible for the contours of the first object 251 to be determined with increased accuracy.

FIG. 4 shows a flowchart for an exemplary method 400 for detection of an object 251, 253 in surroundings of a vehicle 100. The method 400 comprises ascertaining 401, on the basis of sensor data from one or more ambient sensors 111 of the vehicle 100, a set of dynamic cells 206 of a grid 200 of the surroundings of the vehicle 100. In this case, the sensor data indicate cell speeds of cells 201, 206 of the grid 200.

Moreover, the method 400 comprises forming 402 a cell cluster from the set of dynamic cells 206 in dependence on a cluster measure, the cluster measure being dependent on the cell speed of the dynamic cells 206 of the cell cluster. Furthermore, the method 400 comprises expanding 403 the cell cluster with one or more (occupied) cells 201, 206 from an immediate vicinity of the cell cluster, without taking into consideration the cell speed of the one or more cells 201, 206. The method 400 further comprises detecting 404 an object 253 on the basis of the (expanded) cell cluster. As a result of the expansion of a cell cluster on the basis of the physical proximity and without taking into consideration the cell speed, measurement errors for the cell speed can be compensated for. It is thus possible for the contours of an object to be ascertained with increased accuracy.

FIG. 5 shows a flowchart for an exemplary method 500 for detecting an object 251, 253 in surroundings of a vehicle 100. The method 500 comprises ascertaining 501, on the basis of sensor data from one or more ambient sensors 111 of the vehicle 100, a set of cells 205 of a grid 200 of the surroundings of the vehicle 100 that belong to an object 251. In this case, the sensor data indicate cell speeds of cells 201, 206 of the grid 200.

Moreover, the method 500 comprises ascertaining 502 an absolute value of an object speed and of an orientation of the object 251 on the basis of the cell speeds of the cells 205 of the object 251. The method 500 further comprises ascertaining 503 a width and a length of the object 251 taking into consideration the ascertained orientation of the object 251. It is thus possible for the ascertainment of the contours of an object 251 to be improved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting and/or tracking an object in surroundings of a vehicle, the method comprising the acts of:

ascertaining, at a first time, on the basis of sensor data from one or more ambient sensors of the vehicle, measurement data for a multiplicity of cells of a grid of the surroundings of the vehicle, wherein the measurement data for a first cell indicate an object probability of the first cell being occupied by an object, and the measurement data for the first cell indicating a cell speed of the first cell;

ascertaining an occupancy probability of the first cell being occupied by an object that was already detected at a preceding time, the occupancy probability being ascertained on the basis of a state of the object at the preceding time; and assigning the first cell to the object in dependence on the object probability and in dependence on the occupancy probability;

ascertaining, on the basis of the cell speed of the first cell and on the basis of an object speed of the object, an association probability of the first cell being part of the object; and also assigning the first cell to the object in dependence on the association probability, wherein the occupancy probability and the association probability are ascertained for a plurality of objects that were already detected at the preceding time;

the method further comprising the acts of:

ascertaining a combination probability for each of the plurality of objects, the combination probability being a combination of the occupancy probability and the association probability;

selecting a first object from the plurality of objects on the basis of the combination probability for each of the plurality of objects; and assigning the first cell to the first object in dependence on the object probability and in dependence on the combination probability of the first object.

2. The method as claimed in claim 1, wherein the first cell is assigned to the object if the object probability of the first cell is greater than or equal to an object threshold value; and the object threshold value is dependent on at least one of the occupancy probability and the association probability.

3. The method as claimed in claim 1, further comprising the acts of:

ascertaining, on the basis of the measurement data, a set of dynamic cells; wherein a dynamic cell has a cell speed that is greater than or equal to a dynamics threshold value and/or wherein a dynamic cell has an object probability that is greater than or equal to an object threshold value;

forming a cell cluster from the set of dynamic cells in dependence on a cluster measure;

wherein the cluster measure is dependent on the cell speed of the dynamic cells of the cell cluster;

expanding the cell cluster with one or more cells from an immediate vicinity of the cell cluster without taking into consideration the cell speed of the one or more cells; and detecting an object at the first time on the basis of the cell cluster.

4. The method as claimed in claim 3, wherein the cluster measure comprises:

a distance of a dynamic cell from a reference point of the cell cluster;

a distance between two dynamic cells;

a density of dynamic cells;

a relative speed of the cell speed of the dynamic cell relative to a cluster speed of the cell cluster;

a relative speed between the cell speeds of two dynamic cells; and/or a non occupancy probability of one or more cells between the dynamic cell and the reference point of the cell cluster being free.

5. The method as claimed in claim 4, further comprising the act of:

ascertaining a variance of the cell speeds of the cells of the cell cluster or of the expanded cell cluster; and an object detecting in dependence on the variance of the cell speeds.

6. The method as claimed in claim 3, further comprising the act of:

ascertaining a variance of the cell speeds of the cells of the cell cluster or of the expanded cell cluster; and an object detecting in dependence on the variance of the cell speeds.

7. The method as claimed in claim 1, further comprising the acts of:

ascertaining a state of the first object at the first time; and ascertaining the state of the first object on the basis of the measurement data of the cells that are assigned to the first object.

8. The method as claimed in claim 7, further comprising the acts of:

ascertaining an orientation of the first object on the basis of the cell speeds of the cells assigned to the first object; and ascertaining a width and a length of the first object taking into consideration the ascertained orientation of the first object.

9. The method as claimed in claim 8, further comprising the act of:

ascertaining an edge of the first object taking into consideration a non occupancy probability of one or more directly adjacent cells of the first object being free.

10. The method as claimed in claim 7, further comprising the act of:

ascertaining an edge of the first object taking into consideration a non occupancy probability of one or more directly adjacent cells of the first object being free.

* * * * *